(12) United States Patent
Thompson et al.

(10) Patent No.: US 8,537,972 B2
(45) Date of Patent: Sep. 17, 2013

(54) METHOD AND APPARATUS FOR DETERMINING MICRO-REFLECTIONS IN A NETWORK

(75) Inventors: Robert J. Thompson, Horsham, PA (US); Michael J. Cooper, Marietta, GA (US); Charles S. Moore, Langhorne, PA (US); John L. Moran, III, Uxbridge, MA (US)

(73) Assignee: General Instrument Corporation, Horsham, PA (US)

( * ) Notice: Subject to any disclaimer, the term of this patent is extended or adjusted under 35 U.S.C. 154(b) by 1750 days.

(21) Appl. No.: 11/608,028

(22) Filed: Dec. 7, 2006

(65) Prior Publication Data

US 2008/0140823 A1 Jun. 12, 2008

(51) Int. Cl.
 *H04M 1/24* (2006.01)
(52) U.S. Cl.
 CPC ........................................ *H04M 1/24* (2013.01)
 USPC ...................... 379/10.01; 379/24.01; 725/107
(58) Field of Classification Search
 USPC .................. 379/10.01, 29.01; 370/248, 249, 370/251–252, 329, 330, 332, 431, 432, 437, 370/253, 9, 241, 242, 247; 725/111, 112, 725/118, 124, 138, 144; 375/224; 455/67.1, 455/62, 423, 425, 450, 461
 See application file for complete search history.

(56) References Cited

U.S. PATENT DOCUMENTS

| | | | |
|---|---|---|---|
| 3,838,221 A | 9/1974 | Schmidt et al. | |
| 4,245,342 A | 1/1981 | Entenman | |
| 4,385,392 A | 5/1983 | Angell et al. | |
| 4,811,360 A | 3/1989 | Potter | |
| 4,999,787 A | 3/1991 | McNally et al. | |
| 5,228,060 A | 7/1993 | Uchiyama | |
| 5,251,324 A | 10/1993 | McMullan | |
| 5,271,060 A | 12/1993 | Moran et al. | |
| 5,278,977 A | 1/1994 | Spencer et al. | |
| 5,347,539 A | 9/1994 | Sridhar et al. | |
| 5,390,339 A | 2/1995 | Bruckert et al. | |
| 5,463,661 A | 10/1995 | Moran et al. | |
| 5,532,865 A | 7/1996 | Utsumi et al. | |
| 5,557,603 A | 9/1996 | Barlett et al. | |

(Continued)

FOREIGN PATENT DOCUMENTS

DE 69631420 T2 12/2004
EP 0905998 A2 3/1999

(Continued)

OTHER PUBLICATIONS

Office Action, Korean App. No. 10-2007-0126267 (Foreign Text), Oct. 26, 2009.

(Continued)

*Primary Examiner* — Melur Ramakrishnaiah
(74) *Attorney, Agent, or Firm* — Lori Anne D. Swanson

(57) ABSTRACT

The presence of micro-reflections is determined in a network by determining micro-reflections from amplifier and diplex filter impedance mismatches and micro-reflections from drop cable impedance mismatches. The micro-reflections from impedance mismatches are determined by instructing network element to transmit a test signal at a first symbol rate and a first resolution for amplifier and diplex filter impedance mismatches and a second frequency with a second symbol rate and second resolution for micro-reflections from drop cable impedance mismatches. The tests are performed with several frequencies and the channels with the least micro-reflections are identified.

24 Claims, 6 Drawing Sheets

(56) References Cited

U.S. PATENT DOCUMENTS

| | | |
|---|---|---|
| 5,606,725 A | 2/1997 | Hart |
| 5,631,846 A | 5/1997 | Szurkowski |
| 5,692,010 A | 11/1997 | Nielsen |
| 5,694,437 A | 12/1997 | Yang et al. |
| 5,732,104 A | 3/1998 | Brown et al. |
| 5,790,523 A | 8/1998 | Ritchie, Jr. et al. |
| 5,862,451 A | 1/1999 | Grau et al. |
| 5,867,539 A | 2/1999 | Koslov |
| 5,870,429 A | 2/1999 | Moran et al. |
| 5,886,749 A * | 3/1999 | Williams et al. ............. 348/614 |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran et al. |
| 6,385,773 B1 | 5/2002 | Schwartzman et al. |
| 6,389,068 B1 * | 5/2002 | Smith et al. .................... 375/225 |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al-Araji et al. |
| 6,556,562 B1 | 4/2003 | Bhagavath et al. |
| 6,556,660 B1 | 4/2003 | Li et al. |
| 6,559,756 B2 | 5/2003 | Al-Araji |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 * | 2/2004 | Rittman .......................... 702/79 |
| 6,690,655 B1 | 2/2004 | Miner et al. |
| 6,700,875 B1 * | 3/2004 | Schroeder et al. ............ 370/252 |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,785,292 B1 | 8/2004 | Vogel |
| 6,816,463 B2 | 11/2004 | Cooper et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,987,754 B2 | 1/2006 | Shahar et al. |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,584,298 B2 | 9/2009 | Klinker et al. |
| 7,616,654 B2 | 11/2009 | Moran et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,090 B1 | 4/2010 | Kimpe |
| 7,701,938 B1 | 4/2010 | Bernstein et al. |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,778,314 B2 | 8/2010 | Wajcer et al. |
| 7,787,557 B2 | 8/2010 | Kim et al. |
| 7,792,183 B2 | 9/2010 | Massey et al. |
| 7,856,049 B2 | 12/2010 | Currivan et al. |
| 7,876,697 B2 | 1/2011 | Thompson et al. |
| 7,953,144 B2 | 5/2011 | Allen et al. |
| 7,958,534 B1 | 6/2011 | Beser |
| 7,970,010 B2 | 6/2011 | Denney et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0119783 A1 | 8/2002 | Bourlas et al. |
| 2002/0154620 A1 | 10/2002 | Azenkot et al. |

| | | |
|---|---|---|
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0074430 A1 | 4/2003 | Gieseke et al. |
| 2003/0084176 A1 | 5/2003 | Tewari et al. |
| 2003/0101463 A1 | 5/2003 | Greene et al. |
| 2003/0108052 A1 | 6/2003 | Inoue et al. |
| 2003/0120819 A1 | 6/2003 | Abramson et al. |
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Resnik et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1* | 3/2005 | Moran et al. ............ 370/252 |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0109797 A1 | 5/2006 | Ishida et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0058542 A1 | 3/2007 | Thibeault |
| 2007/0076592 A1 | 4/2007 | Thibeault et al. |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223513 A1 | 9/2007 | Pantelias et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0062889 A1 | 3/2008 | Azenko et al. |
| 2008/0069006 A1 | 3/2008 | Walter et al. |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0249421 A1 | 10/2009 | Liu et al. |
| 2010/0083356 A1 | 4/2010 | Steckley et al. |
| 2010/0095360 A1 | 4/2010 | Pavlovski et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0223650 A1 | 9/2010 | Millet et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0110415 A1 | 5/2011 | Cooper et al. |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0054312 A1 | 3/2012 | Salinger |
| 2012/0084416 A1 | 4/2012 | Thibeault et al. |
| 2012/0147751 A1 | 6/2012 | Ulm |

FOREIGN PATENT DOCUMENTS

| | | |
|---|---|---|
| EP | 1235402 A2 | 8/2002 |
| EP | 1341335 A2 | 9/2003 |
| EP | 1341335 A3 | 3/2007 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004/172783 A | 6/2004 |
| JP | 2004343678 A | 12/2004 |
| WO | 0192901 A1 | 6/2001 |
| WO | 0233974 A1 | 4/2002 |
| WO | 2004/062124 A1 | 7/2004 |
| WO | 2007046876 A1 | 4/2007 |
| WO | 2009/146426 A1 | 12/2009 |

OTHER PUBLICATIONS

Office Action, Korean App. No. 10-2007-0126267 (English Translation), Nov. 12, 2009.
Office Action, Mexican Application No. MX/a/2007/015549 (foreign text), dated Apr. 15, 2011.
English Summary of Office Action for Mexican Application No. MX/a/2007/015549 dated Apr. 15, 2011.
Office Action, Chinese Application No. 200710198815.5 (foreign text), dated Dec. 3, 2010.
Office Action, Chinese Application No. 200710198815.5 (english text), dated Dec. 3, 2010.
Office Action, Canadian Application No. 2,605,514 (english text), dated Mar. 23, 2011.
Motorola: "White Paper: Expanding Bandwidth Using Advanced Spectrum Management", pp. 1-12; Sep. 25, 2003.
"A Simple Algorithm for Fault Localization Using Naming Convention and Micro-reflection Signature," Invention Disclosure 60193, Cable Television Laboratories, Inc., Jun. 2008, p. 2.

"Data-Over-Cable Service Interface Specifications Docsis 3.0: MAC and Upper Layer Protocols Interface," CM-SP-MULPIv3.0-I16-110623, Cable Television Laboratories, Inc., Jun. 2011, section 8, pp. 242-266.

"Data-Over-Cable Service Interface Specifications DOSCIS® 3.0—MAC and Upper Layer Protocols Interface Specification," CM-SP-MULPIv3.0-I17-111117, Cable Television Laboratories, Inc., Nov. 17, 2011, pp. 770.

"DOCSIS Best Practices and Guidelines; Proactive Network Maintenance Using Pre-Equalization," CM-GL-PNMP-V01-100415, Cable Television Laboratories, Inc., pp. 123.

"Pre-Equalization Based Pro-active Network Maintenance Process Model for CMs Transmitting on Multiple Upstream Channels," Invention Disclosure 60203, Cable Television Laboratories, Inc., May 2009, pp. 2.

"Pre-Equalization based pro-active network maintenance process model," Invention Disclosure 60177, Cable Television Laboratories, Inc., Jun. 2008, pp. 2.

"Proactive Network Maintenance Using Pre-Equalization," DOCSIS Best Practices and Guidelines, Cable Television Laboratories, Inc., CM-GL-PNMP-V02-110623, Jun. 23, 2011, pp. 133.

"Radio Frequency Interface Specification," Cable Television Laboratories, Inc., Data-Over-Cable Service Interface Specifications DOCSIS 2.0, CM-SP-RFIv2.0-I06-040804, pp. 524.

Campos, L. A., et al., "Pre-equalization based Pro-active Network Maintenance Methodology," Cable Television Laboratories, Inc., (presentation), 2012, pp. 32.

Howald, R. L., et al., "Customized Broadband—Analysis Techniques for Blended Multiplexes," pp. 12.

Howald, R., "Access Networks Solutions: Introduction to S-CDMA," Presentation to Society of Cable Telecommunications Engineers (SCTE) South Florida Chapter, Motorola, Inc., 2009, pp. 15.

Howald, R., "Upstream Snapshots & Indicators (2009)," Regional Samples, Presentation to Society of Cable Telecommunications Engineers (SCTE) South Florida Chapter, Jan. 2010, pp. 22.

Howald, R., et al., "Characterizing and Aligning the HFC Return Path for Successful DOCSIS 3.0 Rollouts," Society of Cable Telecommunications Engineers (SCTE) Cable Tee Expo, Oct. 2009, pp. 66.

Howald, R., et al., "Docsis 3.0 Upstream: Readiness & Qualification," pp. 17.

Howald, R., et al., "The Grown-Up Potential of a Teenage Phy," pp. 65.

Howald, R.,"DOCSIS 3.0 Upstream: Technology, RF Variables & Case Studies," Access Networks Solutions, 2009, presentation to Society of Cable Telecommunications Engineers (SCTE) South Florida Chapter, Jan. 2010, pp. 23.

Hranac, R., "Linear Distortions, Part 1," Communication Technology, Jul. 1, 2005, accessed at www.cable360.net/print/ct/operations/testing/15131.html, pp. 6.

Liu, X., and Bernstein, A., "Variable Bit Rate Video Services in DOCSIS 3.0 Networks," NCTA Technical Papers, 2008, pp. 12.

Newton's Telecom Dictionary, Sep. 1995, Flatiron Publishing, 9th Edition, pp. 216 and 1023, definitions of "carrier to noise ratio" and "signal to noise ratio".

Patrick, M., and Joyce, G., "Delivering Economical IP Video over DOCSIS by Bypassing the M-CMTS with DIBA," SCTE 2007 Emerging Technologies, Topic Subject: Service Velocity & Next Generation Architectures: How Do We Get There?, 2007, pp. 17.

Popper, A., et al, "An Advanced Receiver with Interference Cancellation for Broadband Cable Networks," Juniper Networks, International Zurich Seminar on Broadband Communications Access 2002, pp. 23-1-23-6.

Popper, A., et al, "Ingress Noise Cancellation for the Upstream Channel in Broadband Cable Access Systems," Juniper Networks, IEEE International Conference on Communications 2002, vol. 3, pp. 1808-1812.

Qureshi, S. U. H., "Adaptive Equalization," IEEE, vol. 73, No. 9, Sep. 1985, pp. 1349-1387.

Ramakrishnan, S., "Scaling the DOCSIS Network for IPTV," Cisco Systems, Inc., SCTE Conference on Emerging Technologies and the NCTA Cable Show, 2009, pp. 19.

Shelke, Y. R., "Knowledge Based Topology Discovery and Geo-localization," Thesis, 2010, pp. 173.

Thompson, R., et al., "256-QAM for Upstream HFC," Spring Technical Forum Proceedings, 2010, pp. 142-152.

Thompson, R., et al., "256-QAM for Upstream HFD Part Two," SCTE Cable Tec Expo 2011, Technical Paper, pp. 22.

Thompson, R., et al., "Multiple Access Made Easy," SCTE Cable Tec Expo 2011, Technical Paper, pp. 23.

Thompson, R., et al., "Optimizing Upstream Throughput Using Equalization Coefficient Analysis," National Cable & Telecommunications Association (NCTA) Technical Papers, Apr. 2009, pp. 35.

Thompson, R., et al., "Practical Considerations for Migrating the Network Toward All-Digital," Society of Cable Telecommunications Engineers (SCTE) Cable-Tec Expo, Oct. 2009, pp. 22.

Thompson, R., et al., "64-QAM, 6.4MHz Upstream Deployment Challenges," SCTE Canadian Summit, Toronto, Canada, Technical Paper, Mar. 2011, pp. 25.

Volpe, B., and Miller, W., "Cable-Tec Expo 2011: Advanced Troubleshooting in a DOCSIS © 3.0 Plant," Nov. 14-17, 2011, pp. 17.

Wolcott, L., "Modem Signal Usage and Fault Isolation," U.S. Appl. No. 61/301,835, filed Feb. 5, 2010.

Zhao, F., et al., "Techniques for minimizing error propagation in decision feedback detectors for recording channels," IEEE Transactions on Magnetics, vol. 37, No. 1, Jan. 2001, pp. 12.

Y. Morishita, et al., "An LMS adaptive equalizer using threshold in impulse noise environments", IEEE, ICT 2003 10th International Conference on Telecommunications, vol. 1, pp. 578-582, Feb. 2003.

Anonymous, "Configuring Load Balancing and Dynamic Channel Change (DCC) on the Cisco CMTS", Jan. 1, 2009.

* cited by examiner

METHOD AND APPARATUS FOR DETERMINING MICRO-REFLECTIONS IN A NETWORK

FIELD OF THE INVENTION

This disclosure is directed toward determining micro-reflections in a network. More particularly, this disclosure is directed toward determining micro-reflections in upstream communications in a HFC network to allow an optimal selection of transmission channels.

BACKGROUND OF THE INVENTION

Coaxial cable television systems have been in widespread use for many years and extensive networks have been developed. The extensive and complex networks are often difficult for a cable operator to manage and monitor. A typical cable network generally contains a headend which is usually connected to several nodes which provide content to a cable modem termination system (CMTS) containing several receivers, each receiver connects to several modems of many subscribers, e.g., a single receiver may be connected to hundreds of modems. In many instances several nodes may serve a particular area of a town or city. The modems communicate to the CMTS via upstream communications on a dedicated band of frequency.

Cable networks are also increasingly carrying signals which require a high quality and reliability of service, such as voice communications or Voice over IP (VoIP) communications. Any disruption of voice or data traffic is a great inconvenience and often unacceptable to a subscriber. Various factors may affect the quality of service, including the quality of the upstream channels. One factor that affects the quality of upstream communications is the presence of micro-reflections of communication signals.

A micro-reflection is a copy of a communication signal, such as a signal reflected back onto itself, but delayed in time. There are two significant causes of micro-reflections in an upstream HFC plant, impedance mismatches and diplex filters. Significant micro-reflections can degrade upstream HFC plant performance. Accurately diagnosing micro-reflection issues typically requires technicians or engineers to be at multiple locations within the HFC plant and simultaneously inject test signals at the suspected device locations. The presence of micro-reflections is then detected at the headend location with specialized test equipment, such as a vector signal analyzer. This diagnostic process requires extensive manual effort, often requiring rolling trucks to remote locations within a plant or specialized test equipment. The diagnostic process is also time consuming and costly. Accordingly an automated process to determine whether micro-reflections are appreciably degrading the upstream HFC plant performance is needed which does not significantly impact the HFC network, is cost effective and does not require specialized equipment.

SUMMARY OF THE INVENTION

This disclosure explains an automated process to determine whether micro-reflections are appreciably degrading the upstream HFC plant performance using terminal devices (such as MTAs or cable modems) in conjunction with measurements made at the headend, via a CMTS device, and does not require rolling trucks to remote locations within a plant.

In accordance with principles of the invention, an apparatus of the invention may comprise: a microprocessor configured to provide instructions to a network element to tune to a test frequency and to transmit a test signal at a test symbol rate; a receiver configured to receive the test signal from a network element; and an equalizer which is configured to measure micro-reflections contained in the received test signal, wherein the microprocessor is configured to determine an optimal communication channel to communicate with the network element based on the measured micro-reflections.

In the apparatus, the test signal may be instructed to be transmitted with a predetermined resolution and may be about 2,560 ksym/s and the predetermined resolution is about 390 ns. The test symbol rate may be about 5,120 ksym/s and the predetermined resolution may be about 195 ns.

In the apparatus, the microprocessor may repeatedly instruct the network element to tune to another frequency and transmit the test signal until all of the usable upstream frequencies have been tested. The microprocessor may also be further configured to instruct the network element to transmit a second test signal having a second symbol rate, whereby the second test signal has a higher symbol rate than the first test signal.

In the apparatus, the microprocessor may further be configured to determine a distance from a source of the measured micro-reflections.

A method for monitoring a network in accordance with the invention may comprise the steps of: selecting a network element as a test network element; instructing the test network element to transmit a test signal at a first frequency f1 as a test frequency and a test symbol rate; measuring micro-reflections on the test frequency by measuring micro-reflections in the test signals transmitted by the test network element; instructing the test network element to transmit the test signal on a second frequency as the test frequency; repeating the step of measuring micro-reflections on the test frequency as the second frequency by measuring micro-reflections in the test signal transmitted by the test network element; and determining optimum frequency channels for communications based on the micro-reflections in the test frequency as the first frequency and the second frequency.

The step of measuring micro-reflections may include measuring micro-reflections caused by impedance mismatches in amplifiers and diplex filters in the network. The test signal may be transmitted at a test symbol rate of approximately 2,560 kysm/s at a resolution of approximately 390 ns.

The step of measuring micro-reflections may include measuring micro-reflections caused by impedance mismatches in drop cables in the network. The test signal may be transmitted at a test symbol rate of approximately 5,120 kysm/s at a resolution of approximately 195 ns.

The method may further include repeating the steps of instructing the test network element to transmit the test signal on another frequency selected as the test frequency; and measuring micro-reflections until a plurality of usable upstream frequency channels have been tested as the test frequency.

The method may further include the step of selecting another network element as the test network element and repeating the steps of instructing the test network element to transmit the test signal on a second frequency as the test frequency; and measuring micro-reflections until a plurality of network elements on a network port of a cable modem termination system and a plurality of usable upstream frequency channels have been tested.

The method may further include the step of estimating a location of a source of micro-reflections in a network based on delay times between a signal and a corresponding micro-reflections and a propagation velocity factor of cables in the network.

A computer readable medium in accordance with the invention may carry instructions for a computer to perform a method for monitoring a network, the method comprising the steps of: selecting a network element as a test network element; instructing the test network element to transmit a test signal at a first frequency f1 as a test frequency and a test symbol rate; measuring micro-reflections on the test frequency by measuring micro-reflections in the test signals transmitted by the test network element; instructing the test network element to transmit the test signal on a second frequency as the test frequency; repeating the step of measuring micro-reflections on the test frequency as the second frequency by measuring micro-reflections in the test signal transmitted by the test network element; and determining optimum frequency channels for communications based on the micro-reflections in the test frequency as the first frequency and the second frequency.

In the computer readable medium, the instructions may further including repeating the steps of instructing the test network element to transmit the test signal on another frequency selected as the test frequency; and measuring micro-reflections until a plurality of usable upstream frequency channels have been tested as the test frequency.

In the computer readable medium, the instructions may further comprising the step of selecting another network element as the test network element and repeating the steps of instructing the test network element to transmit the test signal on a second frequency as the test frequency; and measuring micro-reflections until a plurality of network elements on a network port of a cable modem termination system and a plurality of usable upstream frequency channels have been tested.

In the computer readable medium, the instructions may further comprise performing the step of estimating a location of a source of micro-reflections in a network based on delay times between a signal and a corresponding micro-reflections and a propagation velocity factor of cables in the network.

Those of skill in the art will appreciate that the techniques of this invention allows an operator to automatically determine micro-reflections in upstream communication channels without the need for placing test instrumentation remotely in the cable plant. In addition, the technique discloses in the invention does not require an operator or technician to be dispatched to remote locations in the HFC network. All measurements may be made through the use of the existing terminal devices (specifically, DOCSIS terminal devices such as MTAs and cable modems) as well as headend equipment (specifically a DOCSIS CMTS). Accurate knowledge of the mirco-reflections will enable an operator to utilize the available resources of their network more efficiently, such as by switching to communication channels with fewer micro-reflections or by replacing network components in which the micro-reflections are introduced to improve signal quality and network speed.

Additionally, this process will optimize micro-reflection performance within the upstream HFC plant. This process uses only DOCSIS terminal devices in conjunction with measurements made at the headend via a DOCSIS CMTS device, and does not require rolling trucks to remote locations within a plant or specialized test equipment.

BRIEF DESCRIPTION OF THE DRAWINGS

The following drawings serve to illustrate the principles of the invention.

DETAILED DESCRIPTION OF THE INVENTION

This disclosure provides for remote assessment of micro-reflections for terminal devices within a CMTS serving group as well as a means for optimally reassigning serving groups to active channels with improved micro-reflection performance. The micro-reflection assessment of all network elements, such as cable modems, set top boxes and media terminal adapter (MTAs) and DOCIS (data over cable system) terminal devices, within a CMTS serving group may provide a mapping of micro-reflection levels over all active channels available to the network elements. This methodology begins by querying network elements within a CMTS serving group to obtain their micro-reflection performance over a range of active channels. The micro-reflection mappings are used to determine optimum active channels, which are defined as channels which have the least amount of worst-case micro-reflections present. To assess the full extent of micro-reflection conditions that may exist with a upstream HFC plant, two symbol rates are preferably used. A first low rate symbol rate, for example of 2,560 kysm/sec, is used to identify micro-reflections generated from amplifier diplex filters and a second higher rate symbol rate, for example of 5,120 ksym/s, is used to identify micro-reflections generated from local drop cable impedance mismatches. This process may be repeated until all CMTS serving groups have been optimized. Preferably, the micro-reflection tests should not occur in conjunction with other changes in the network, such as changing of optical routing, ingress level switching or any other routine or event that will likely cause RF levels to be unstable.

In order to ensure that there is a sufficient margin of power in the network to perform the tests in this invention, the operator should have knowledge of the upstream power spectrum for the available upstream frequency regions. This knowledge may assist in facilitating test channel placement and an ability to add additional test channel power without impacting HFC performance and subscriber services. This knowledge may also give the operator confidence that distortions that may be caused by insufficient power margins are not affecting the test performed. While any suitable approach for determining the available power margin in a network may be used, one approach is described in commonly assigned disclosure entitled METHOD AND APPARATUS FOR DETERMINING THE TOTAL POWER MARGIN AVAILABLE FOR AN HFC NETWORK, filed on Oct. 20, 2006 and assigned U.S. Ser. No. 11/551,014, herein incorporated by reference in its entirety.]

A methodology for isolating devices which reside on the same optical node or serving group is provided in a commonly assigned disclosure, entitled METHOD AND APPARATUS FOR GROUPING TERMINAL NETWORK DEVICES filed on Sep. 5, 2006 and assigned U.S. Ser. No. 11/470,034, herein incorporated by reference in its entirety.

Figure 1:
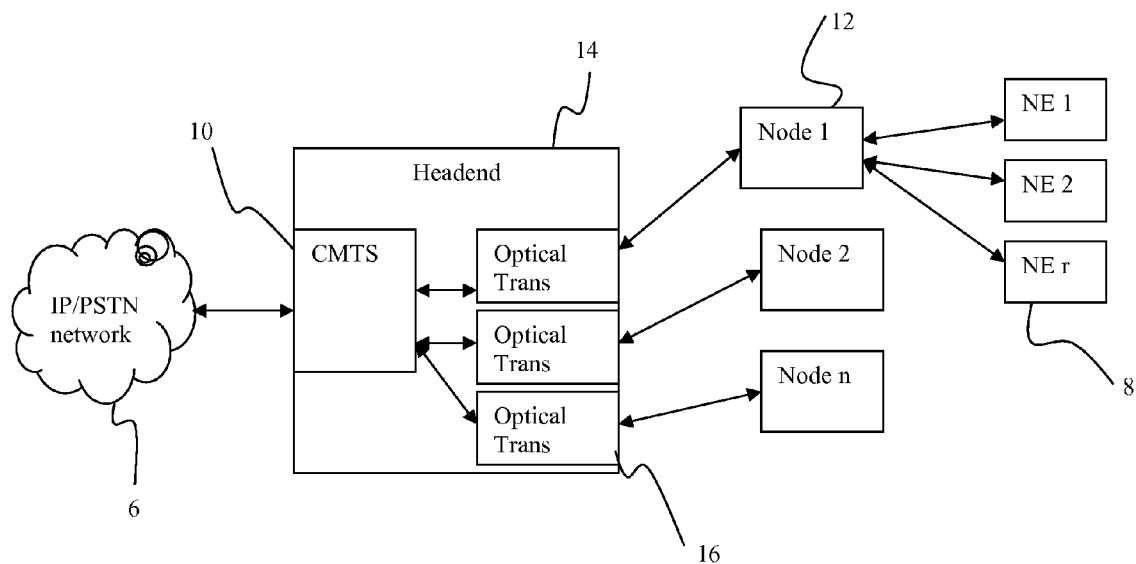
FIG. 1 illustrates an exemplary network in accordance with the principles of the invention.

FIG. 1 illustrates an exemplary network in which a plurality of terminal network elements 8 (e.g. cable modems, set top boxes, televisions equipped with set top boxes, or any other element on a network such as an HFC network) are connected to a cable modem termination system (CMTS) 10 located in a headend 14 through nodes 12 and one or more taps (not shown). In an exemplary arrangement, headend 14 also contains an optical transceiver 16 which provides optical communications through an optical fiber to the plurality of nodes 12. The CMTS 10 connects to an IP or PSTN network 6. Those of skill in the art will appreciate that there may be a plurality of nodes 12 connected to a headend, and a headend may contain a plurality of CMTS 10 units, each of which contain a plurality of receivers (e.g. 8 receivers) each of which communicate with a plurality (e.g. 100 s) of network elements 8. The CMTS 10 may also contain a spare receiver which is not continuously configured to network elements 8, but may be selectively configured to network elements 8. Use of a spare receiver is described in commonly assigned, U.S. Ser. No. 11/171,066, filed on Jun. 30, 2005 and titled Automated Monitoring of a Network, herein incorporated by reference in its entirety.

Figure 2:
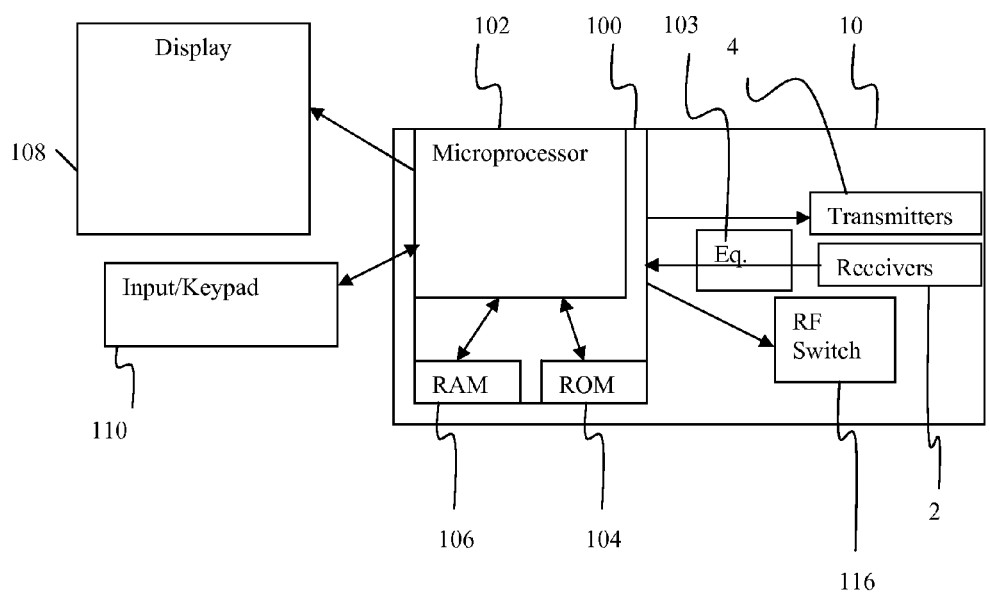
FIG. 2 illustrates a logical architecture of an exemplary CMTS 10 to facilitate an understanding of the invention.

FIG. 2 illustrates a logical architecture of an exemplary CMTS 10 to facilitate an understanding of the invention. As illustrated in FIG. 2, CMTS 10 may contain a processing unit 100 which may access a RAM 106 and a ROM 104, and may control the operation of the CMTS 10 and RF communication signals to be sent by the network elements 8 to the CMTS 10. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a station maintenance (SM) is being performed or a receiver is in need of load balancing. An input keypad 110 may also be connected to processing unit 100 and may allow an operator to provide instructions, processing requests and/or data to processor 100.

RF transceiver (transmitter/receiver) unit preferably contains a plurality of transmitters 4 and receivers 2 to provide bi-directional communication with a plurality of network elements 8 through optical transceivers 16, nodes 12 and a plurality of network taps (not shown). Those of skill in the art will appreciate that CMTS 10 may contain a plurality of RF receivers 2, e.g. 8 RF receivers and a spare RF receiver. Each RF receiver 2 may support over 100 network elements. The RF receiver 2, such as a Broadcom 3140 receiver (receiver), preferably provides the received RF signals to an equalizer 103 which is used to acquire equalizer values and burst modulation error ratio (MER) measurements, packet error rate (PER) and bit error rate (BER). Equalizer 103 is preferably a multiple tap linear equalizer (e.g. a 24 tap linear equalizer), which also may be known as a feed forward equalizer (FFE). Equalizer 103 may be integrally contained in RF receiver 2 or may be a separate device. RF receiver 2 may also include FFT module 308 to support power measurements. The communication characteristics of each receiver 2 may be stored on ROM 104 or RAM 106, or may be provided from an external source, such as headend 14. RAM 104 and/or ROM 106 may also carry instructions for microprocessor 102.

Figure 3:
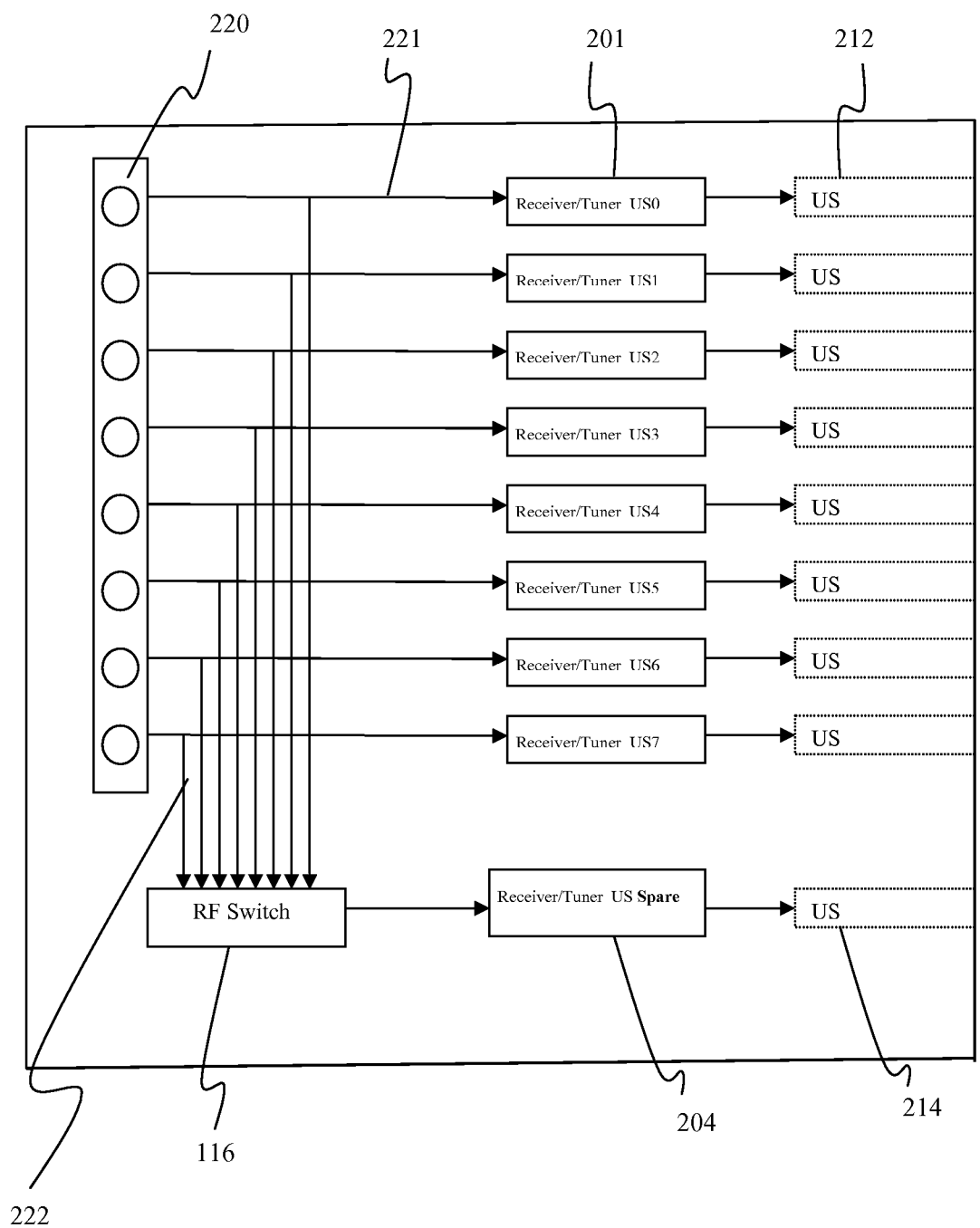
FIG. 3 illustrates a logical arrangement of a group of receivers 201 to facilitate an understanding of the invention.

FIG. 3 illustrates a logical arrangement of a group of receivers 201 to facilitate an understanding of the invention. As illustrated in FIG. 3 a spare receiver 204 may be tapped into each of the primary receiver ports 220 (e.g. R0-R7) in a non-intrusive manner. As illustrated, CMTS receiver ports 220, which may be in the form of Amphenol connectors, are provided to allow cables, e.g. coaxial cables, (not shown) to be connected with primary receivers 2.

Spare receiver 204 preferably taps into signal lines 221 of primary receiver ports 220 via signal lines 222, and the taps are preferably located where the cable signal comes from receiver ports 220 into the receivers 201 so both the connected primary receiver 201 and the spare receiver 204 may receive the same signal. Those of skill in the art will appreciate that each of the primary receivers 201 (e.g. receivers R0-R7) receive signals according to different communication characteristics, e.g. communication on a different frequency (RF band) and communication protocols. Spare receiver 204 is preferably tunable to the RF bands of each of the primary receivers 201. Preferably, the spare receiver 204 connects (matrices) with only one primary receiver 201 at a time.

When a cable operator initiates a testing operation they may select any registered modem of their choice or the CMTS 10 may select the modem for them. Once the modem has been selected it is moved (tuned to the frequency) to the spare receiver testing data is passed to it and the results are measured. Once the testing measurements are completed the modem is moved back (instructed to retune to frequency of the primary receiver) to its original primary receiver. This whole process is preferably performed without deregistering the modem from the network to avoid disrupting the subscriber's service or any other services on the primary receiver to other subscribers.

In a preferred implementation, the present invention may use a DOCSIS network element, such as a cable modem, to generate the micro-reflection test signal. Accordingly, the test signals may be implemented using one of the available upstream DOCSIS bandwidths, e.g. 200 kHz, 400 kHz, 800 kHz, 1600 kHz, 3200 kHz or 6400 kHz. A preferred implementation may use the narrow 800 kHz bandwidth at the upper band edge where diplexer rolloff is significant since narrow bandwidths minimize the amount of clean spectrum required within the return path, and wider bandwidths are used where available spectrum permits in order to gain improved resolution in the measurements.

Figure 4:
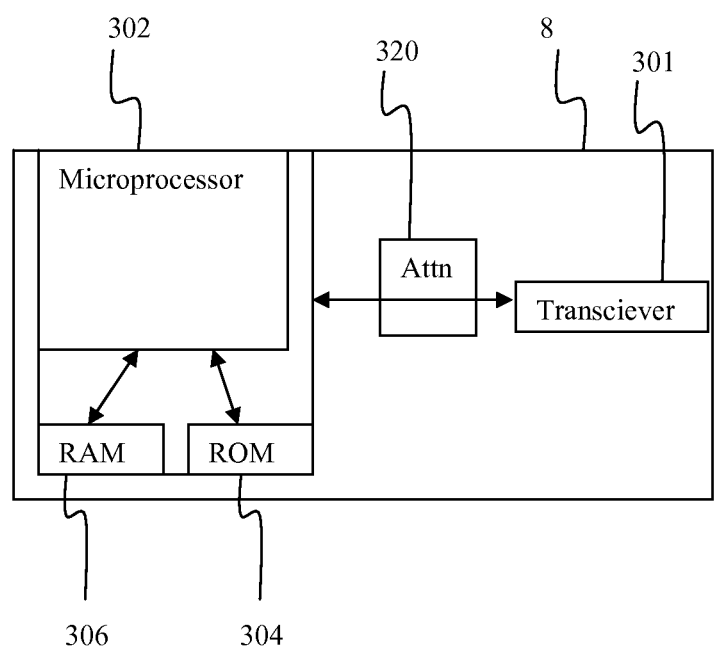
FIG. 4 illustrates an exemplary network element 8, such as a cable modem.

FIG. 4 illustrates an exemplary network element 8, such as a cable modem. Network element 8 preferably contains a processor 302 which may communicate with a RAM 306 and ROM 304, and which controls the general operation of the network element, including the pre-equalization parameters and preamble lengths of communications sent by the network element in accordance with instructions from the CMTS 10. Network element 8 also contains a transceiver (which includes a transmitter and receiver) which provides bidirectional RF communication with CMTS 10. Network element 8 may also contain an equalizer unit which may equalize the communications to CMTS 10. Network element 8 may also contain an attenuator 320 which may be controlled by microprocessor to attenuate signals to be transmitted to be within a desired power level. Those of skill in the art will appreciate that the components of network element 8 have been illustrated separately only for discussion purposes and that various components may be combined in practice.

Figure 5:
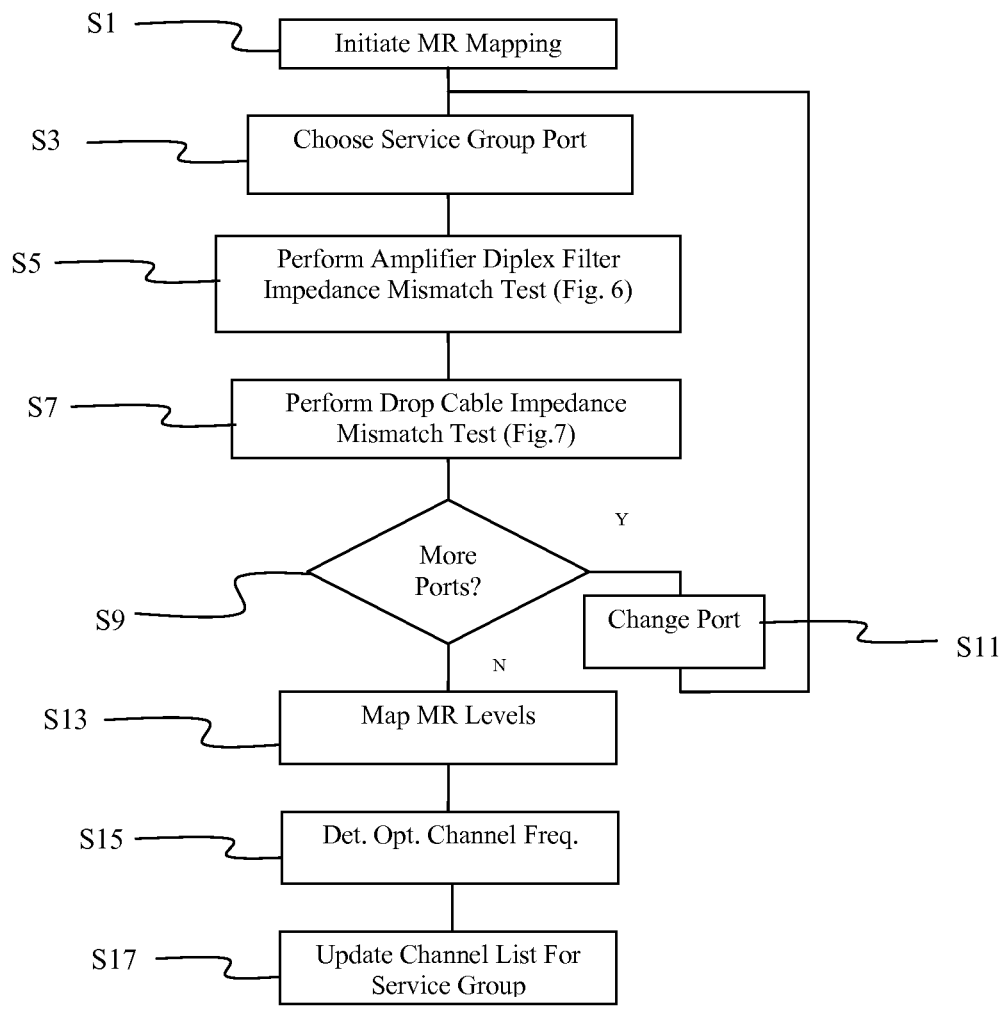
FIG. 5 illustrates an exemplary process in accordance with the principles of the present invention.
Figure 6:
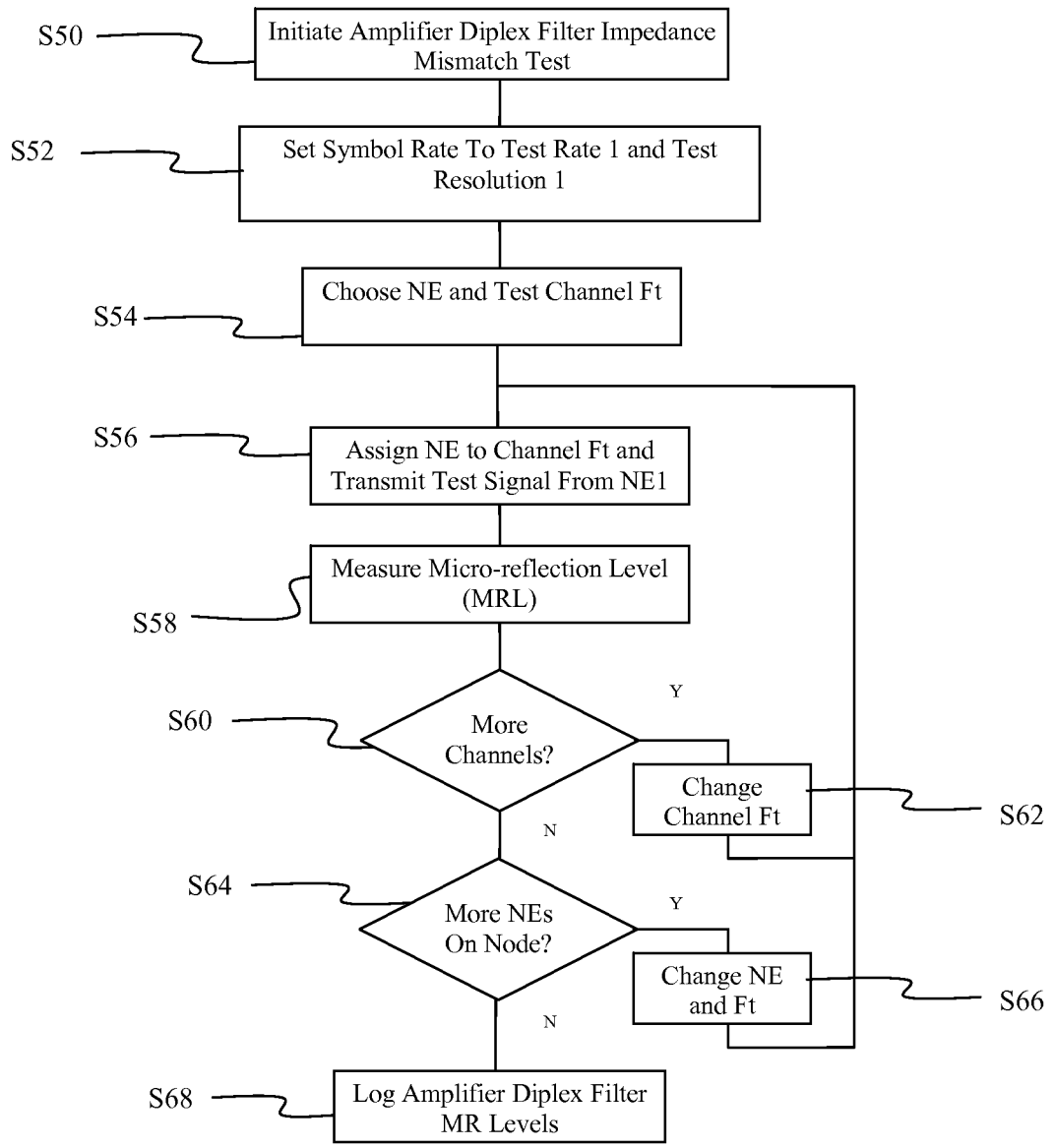
FIG. 6 illustrates an exemplary process for performing an amplifier diplex filter impedance mismatching test.
Figure 7:
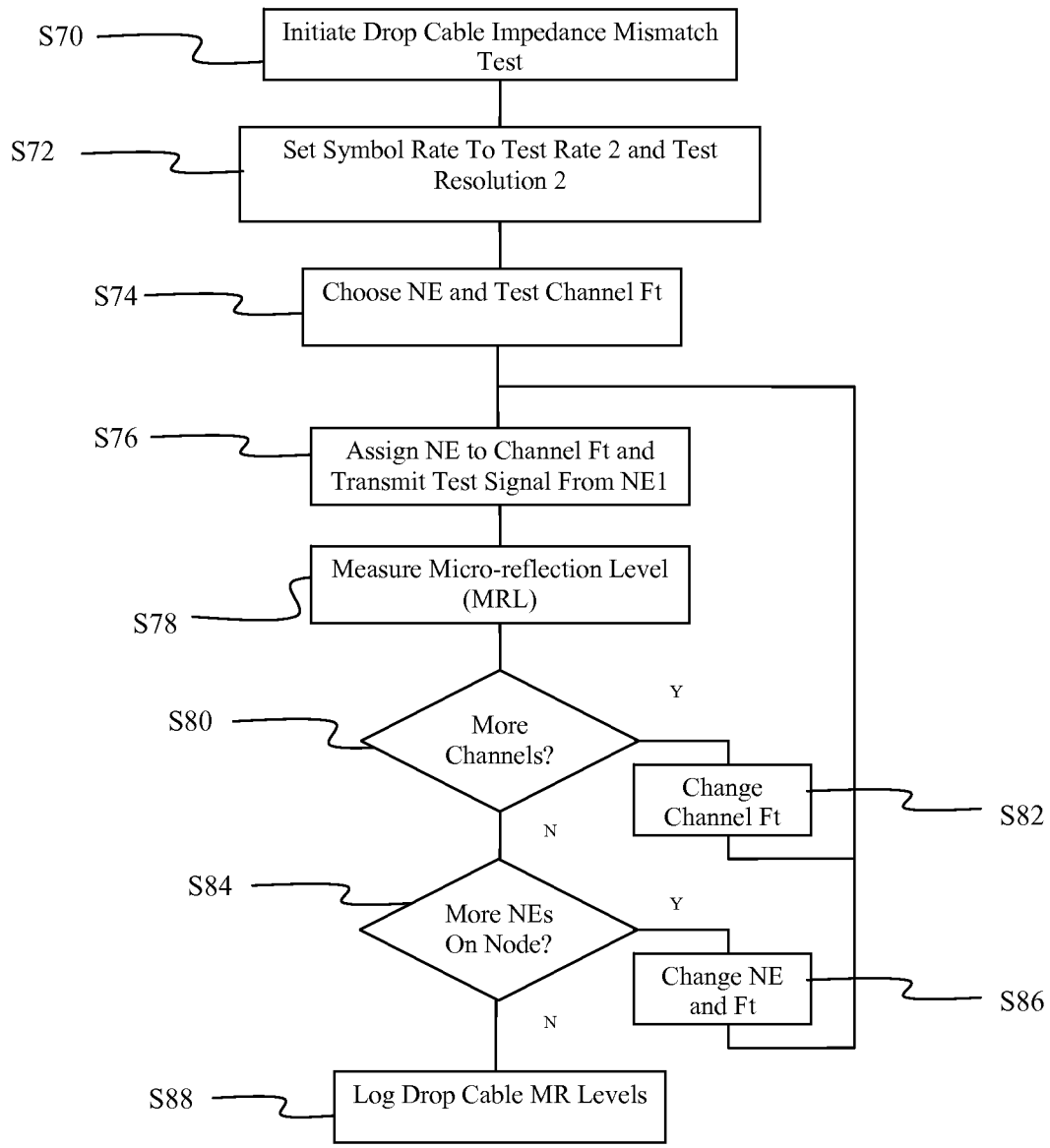
FIG. 7 illustrates an exemplary process for performing a drop cable impedance mismatching test.

An exemplary process for automatically determining the micro-reflections in a service group, which may be associated with a node, is illustrated in FIGS. 5-7. As illustrated in step S1 of FIG. 5, the micro-reflection mapping process is initiated and service group port is chosen, step S3. One part of the micro-refection mapping process includes performing low symbol rate test (e.g. 2,560 Ksym/s) which preferably tests impedance mismatches in amplifiers and diplex filters, step S5. Another part of the micro-reflection mapping process may include performing a high symbol rate test (e.g. 5,120 Ksym/ s) which preferably tests drop cable impedance mismatch, step S7. Those of skill in the art will appreciate that if the test signal is 2,560 Ksym/s then each occupied channel would use a 3.2 MHz bandwidth and if the test signal is 5,120 Ksym/s, then each occupied test channel would use a 6.4 MHz bandwidth. These two separate tests are preferably performed to analyze the network at different resolutions. However, since the 5-42 MHz spectrum is only able to contain six channels (38.4 MHz occupied bandwidth, the high symbol rate test (e.g. 5,120 Ksym/s) may be adequate. However, the 2,560 Ksym/s test signal provides an opportunity to investigate spectrum slots that are not wide enough (less than 6.4 MHz wide) for the high symbol rate test.

More particularly, since the equalizer taps are typically spaced evenly, the spacing between taps is proportional to time and physical distance to the reflection. Those of skill in the art will appreciate that a micro-reflection occurs latter in time from its original signal, and hence has a delay associated with it. Those of skill in the art will also appreciate that as the symbol rate doubles (e.g. from 2,560 Ksym/sec to 5,120 Ksym/sec), the increment of time between the taps of the equalizer is reduced by half (e.g. from 390 nsec to 195 nsec), hence doubling the resolution of the measurement by the equalizer. The location of the source of the micro reflection may be determined based on the travel time of the reflective event and the propagation velocity factor of the cable (e.g. RG-6 coaxial cable at 1.2 ns per foot). For example, if the time delay of a micro-reflection is 195.3 ns, dividing the delay by two to provide the time to traverse the coaxial cable from the source to the termination element creating the micro-reflection (e.g. 195.3 ns/2=97.65 ns) and then dividing by the propagation velocity factor of 1.2 ns/ft provides an estimate of the micro-reflection to be at 81.4 ft from the network element (e.g. a two way splitter in a home).

In step S9, the process determines if more ports are available for testing, and if YES, the port being tested is changed to another port, step S11. If no more ports are available, NO in step S9, the micro-reflection levels determined in the amplifier diplex filter impedance mismatching test and/or the drop cable impedance mismatch test are mapped, step S13, preferably by listing the micro-reflection levels identified for various frequencies associated with the impedance mismatch tests performed. Using the mapped micro-reflection levels, the optimum operational RF channel frequencies are identified, step S15.

The optimal operational RF channel selection is preferably based on the measured micro-reflection levels (MRL) and may be performed by establishing a ranking system for the individual equalizer coefficient values for each transmitted frequency channel. While any suitable ranking may be used, an exemplary order of microreflection ranking is illustrated in Table 1.

TABLE 1

| Channel | Mag1stMRL(dB) | TapLoc 1stMRL | Mag2ndMRL(dB) | TapLoc 2ndMRL |
|---|---|---|---|---|
| 1 | 41 | 3 | 43 | 1 |
| 2 | 41 | 3 | 43 | 7 |
| 3 | 37 | 1 | 41 | 5 |
| 4 | 33 | 2 | 35 | 5 |
| 5 | 25 | 5 | 27 | 8 |
| 6 | 21 | 4 | 29 | 3 |

Table 1 illustrates exemplary micro-reflection levels that may be measured from a performance drop cable impedance mismatch test for discussion purposes. As illustrated, the ranking may include the magnitude of the largest measured MRLs, labeled as Mag1stMRL and the tap location of the 1st largest MRL. The ranking may also list the magnitude of the second largest measured MRL, labeled Mag2ndMRL, and the tap location of the second MRL.

Those of skill in the art will appreciate that the MRL represents a ratio of signal power to micro-reflection power which is determined by looking at equalizer coefficients. For example, the signal power is the power present in the "center" or "main" tap of the equalizer coefficient array. The micro-reflection power is the sum of all the power present in the other (non main tap) equalizer coefficients. Table 1 contains the dB representation of the ratio between the signal power and the micro reflection power (e.g. 10*log10(signal power/microreflection power)). A very large number (41 for example) implies that the microreflection is very small compared to the signal power. A very small number (21 for example) implies a large microreflection power relative to the signal level. Those of skill in the art will also appreciate that by selecting the channel with the tap location closest to the main tap, there is an increased likelihood that the cable modems will compensate for the micro reflections with pre-equalization. The channels are sorted in order of preference in Table 1, channel 1 is the best and channel 6 is the worst.

The channels which have the lowest micro reflection levels (the highest MRLs) may be selected as the optimum channels for carrying data with a symbol rate of 5,120 Ksym/s. For example, the channel with the highest magnitude of $1^{st}$ MRL is the first preferred operational RF channel. The channel with an equal level of first and second MRL as the $1^{st}$ channel but with a greater distance of the micro-reflection to a tap is the second preferred operational RF channel, as illustrated in table 1 as channel 2. The RF channel with the $3^{rd}$ highest MRL at the closest tap to the main tap (hence the closest distance and equalizer tap) is the $3^{rd}$ preferred operational RF channel. The RF channel with MRL lower than or equal to the $3^{rd}$ preferred channel but is further in time (equalizer tap and distance) from the main tap is the $4^{th}$ preferred operational RF channel. The RF channel with MRL lower than or equal to the $4^{th}$ preferred channel but is further in time (equalizer tap and distance) from the main tap is the $5^{th}$ preferred operational RF channel. The RF channel with a first MRL lower than the $5^{th}$ channel but a second MRL higher than the $5^{th}$ channel is the $6^{th}$ preferred channel. The RF channel with MRL lower than or equal to the (n−1)th preferred channel but is further in time (equalizer tap and distance) from the main tap is the nth preferred or least preferred operational RF channel.

Those of skill in the art will appreciate that a similar table may be created for measurements made in performing the Amplifier Diplex Filter Impedance Mismatch Test, step S5. This table would essentially be the same as described above, the difference in the test signal is now 2,560 Ksym/s and the number of available slots in the headend increases from 6 available channels to 12 available channels. The result of the 2560 Ksym/s test would result in 12 available channels ranked in their order by MRL based on the criteria above.

Combining the two tables would give the operator a basis for choosing to use a particular transceiver slot on the CMTS 10 for either one 6.4 MHz (5120 Ksym/sec) or two 3.2 MHz (2560 Ksym/sec) channels. The entire 5-42 MHz return spectrum can be then planned to maximize the utilization of a mixture of 6.4 MHz (5120 Ksym/s) and 3.2 MHz (2560 Ksym/sec) channels based on their microreflection impairment environment.

FIG. 6 illustrates an exemplary process for performing an amplifier diplex filter impedance mismatching test. The test is initiated at step S50 and the symbol rate is set to a test rate 1 at a test resolution 1, step S52. In a preferred implementation, the test rate 1 may be at a symbol rate of 2,560 kysm/sec with a resolution of 390 ns. A network element NE on the port is chosen and a test channel frequency Ft is chosen, such as the lowest frequency channel location, step S54. The selected network element is tuned to the selected frequency Ft and instructed to transmit a test signal from the selected network element, step S56. The return signals received from the selected network element are evaluated at the headend, such as by measuring the MER, PER and/or BER, and equalizer coefficients contained in the CMTS, in step S58. Preferably, the return signals form the network element are received by the spare receiver, and the equalizer is associated with the spare receiver. In step S60, if more active upstream channels exist, YES, the channel frequency Ft is changed to another channel frequency as the test channel frequency, step S62. If no more channels exist, NO in step S60, a determination is made as to whether more network elements in step S64. If there are more network elements, step S64 YES, another network element is chosen and the first test frequency Ft is assigned. The micro-reflections which are identified during the test are logged in step S68. The MER, PER and/or BER and equalizer coefficients are measured at each incremental increase in frequency and the return path signals are monitored for degradation in MER, PER or BER and equalizer coefficients.

FIG. 7 illustrates an exemplary process for performing a drop cable impedance mismatching test. The test is initiated at step S70 and the symbol rate is set to a test rate 2 at a test resolution 2, step S72. In a preferred implementation, the test rate 2 may be at a symbol rate of 5,120 kysm/sec with a resolution of 195 ns. A network element NE on the port is chosen and a test channel frequency Ft is chosen, such as the lowest frequency channel location, step S74. The selected network element is tuned to the selected frequency Ft and instructed to transmit a test signal from the selected network element, step S76. The return signals received from the selected network element are evaluated at the headend, such as by measuring the MER, PER and/or BER and equalizer coefficients contained in the CMTS at step S78. Preferably, the return signals form the network element are received by the spare receiver at the headend. In step S80, if more active upstream channels exist, YES, the channel frequency Ft is changed to another channel frequency as the test channel frequency, step S82. If no more channels exist, NO in step S80, a determination is made as to whether more network elements in step S84. If there are more network elements, step S84 YES, another network element is chosen and the first test frequency Ft is assigned. The micro-reflections which are identified during the test are logged in step S88. The MER, PER and/or BER and equalizer coefficients are measured at each incremental increase in frequency and the return path signals are monitored for degradation in MER, PER BER or equalizer coefficients.

The CMTS spare receiver is preferably used to obtain the error rate and micro-reflection measurements to avoid impacting service provided to customers. When the spare receiver is used, the return communication channels may be active, hence avoiding a disruption in active service at the time the operator desires to perform the tests. Alternatively, another receiver could be used to make the measurements by being taken "off line" or by adjusting for the impact caused by normal service.

The processes in FIGS. 5-7 may be implemented in hard wired devices, firmware or software running in a processor. A processing unit for a software or firmware implementation is preferably contained in the CMTS. Any of the processes illustrated in FIGS. 5-7 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

The invention enables the technician or engineer to remotely analyze upstream communication channels cheaply and quickly at a central location, such as the headened such as by using the Motorola BSR64000, rather than using external test equipment, such as the vector signal analyzer and deploying technicians to various locations within the cable plant. The invention also enables the tests to be performed without impacting active services. All measurements may be made through the use of the existing terminal devices (specifically, DOCSIS terminal devices such as MTAs and cable modems) as well as headend equipment (specifically a DOCSIS CMTS).

Those of skill in the art will appreciate that the techniques of this invention allows an operator to automatically determine micro-reflections in upstream communication channels without the need for placing test instrumentation remotely in the cable plant. In addition, the technique discloses in the invention does not require an operator or technician to be dispatched to remote locations in the HFC network. All measurements may be made through the use of the existing terminal devices (specifically, DOCSIS terminal devices such as MTAs and cable modems) as well as headend equipment (specifically a DOCSIS CMTS). Accurate knowledge of the mirco-reflections will enable an operator to utilize the available resources of their network more efficiently, such as by switching to communication channels with fewer micro-reflections or by replacing network components in which the micro-reflections are introduced to improve signal quality and network speed.

What is claimed is:

1. An apparatus for monitoring a network comprising:
a microprocessor configured to provide instructions to a network element within a cable modem termination system (CMTS) serving group to tune to a test frequency and to transmit a test signal at a test symbol rate;
a receiver configured to receive the test signal from a network element; and
an equalizer which is configured to measure micro-reflections contained in the received test signal,
wherein the microprocessor is configured to determine an optimal communication channel to communicate with the network element based on the measured micro-reflections, further wherein the microprocessor is configured to assign the determined optimal communication channel to the CMTS serving group.

2. The apparatus of claim 1, wherein the test signal is instructed to be transmitted with a predetermined resolution.

3. The apparatus of claim 2, wherein the test symbol rate is about 2,560 ksym/s and the predetermined resolution is about 390 ns.

4. The apparatus of claim 2, wherein the test symbol rate is about 5,120 ksym/s and the predetermined resolution is about 195 ns.

5. The apparatus of claim 2, wherein the microprocessor repeatedly instructs the network element to tune to another frequency and transmit the test signal until all of the usable upstream frequencies have been tested.

6. The apparatus of claim 1, wherein the microprocessor is further configured to instruct the network element to transmit a second test signal having a second symbol rate, whereby the second test signal has a higher symbol rate than the first test signal.

7. The apparatus of claim 1, wherein the microprocessor is further configured to determine a distance from a source of the measured micro-reflections.

8. A method for monitoring a network comprising the steps of:
   selecting a network element within a cable modem termination system (CMTS) serving group as a test network element;
   instructing the test network element to transmit a test signal at a first frequency f1 as a test frequecy and a test symbol rate;
   measuring micro-reflections on the test frequency by measuring micro-reflections in the test signals transmitted by the test network element;
   instructing the test network element to transmit the test signal on a second frequency as the test frequency;
   repeating the step of measuring micro-reflections on the test frequency as the second frequency by measuring micro-reflections in the test signal transmitted by the test network element;
   determining optimum frequency channels for communications based on the micro-reflections in the test frequency as the first frequency and the second frequency; and
   assigning the determined optimal frequency channels to the CMTS serving group.

9. The method of claim 8, wherein the step of measuring micro-reflections includes measuring micro-reflections caused by impedance mismatches in amplifiers and diplex filters in the network.

10. The method of claim 9, wherein the test signal is transmitted at a test symbol rate of approximately 2,560 kysm/s at a resolution of approximately 390 ns.

11. The method of claim 8, wherein the step of measuring micro-reflections includes measuring micro-reflections caused by impedance mismatches in drop cables in the network.

12. The method of claim 11, wherein the test signal is transmitted at a test symbol rate of approximately 5,120 kysm/s at a resolution of approximately 195 ns.

13. The method of claim 8, further including repeating the steps of instructing the test network element to transmit the test signal on another frequency selected as the test frequency; and measuring micro-reflections until a plurality of usable upstream frequency channels have been tested as the test frequency.

14. The method of claim 8, further including the step of selecting another network element as the test network element and repeating the steps of instructing the test network element to transmit the test signal on a second frequency as the test frequency; and
   measuring micro-reflections until a plurality of network elements on a network port of a cable modem termination system and a plurality of usable upstream frequency channels have been tested.

15. The method of claim 8, further comprising the step of estimating a location of a source of micro-reflections in a network based on delay times between a signal and a corresponding micro-reflections and a propagation velocity factor of cables in the network.

16. The method of claim 8, further including the step of selecting another CMTS serving group and repeating the steps of instructing the test network element to transmit the test signal on a second frequency as the test frequency; and measuring micro-reflections until a plurality of network elements on a network port of a cable modem termination system, a plurality of usable upstream frequency channels, and a plurality of CMTS serving groups have been tested.

17. A non-transitory computer readable medium carrying instructions for a computer to perform a method for monitoring a network, the method comprising the steps of:
   selecting a network element within a cable modem termination system (CMTS) serving group as a test network element;
   instructing the test network element to transmit a test signal at a first frequency f1 as a test frequecy and a test symbol rate;
   measuring micro-reflections on the test frequency by measuring micro-reflections in the test signals transmitted by the test network element;
   instructing the test network element to transmit the test signal on a second frequency as the test frequency;
   repeating the step of measuring micro-reflections on the test frequency as the second frequency by measuring micro-reflections in the test signal transmitted by the test network element;
   determining optimum frequency channels for communications based on the micro-reflections in the test frequency as the first frequency and the second frequency; and
   assigning the determined optimal frequency channels to the CMTS serving group.

18. The non-transitory computer readable medium of claim 17, wherein the step of measuring micro-reflections includes measuring micro-reflections caused by impedance mismatches in amplifiers and diplex filters in the network.

19. The non-transitory computer readable medium of claim 18, wherein the test signal is transmitted at a test symbol rate of approximately 2,560 kysm/s at a resolution of approximately 390 ns.

20. The non-transitory computer readable medium of claim 17, wherein the step of measuring micro-reflections includes measuring micro-reflections caused by impedance mismatches in drop cables in the network.

21. The non-transitory computer readable medium of claim 20, wherein the test signal is transmitted at a test symbol rate of approximately 5,120 kysm/s at a resolution of approximately 195 ns.

22. The non-transitory computer readable medium of claim 17, further including repeating the steps of instructing the test network element to transmit the test signal on another frequency selected as the test frequency; and measuring micro-reflections until a plurality of usable upstream frequency channels have been tested as the test frequency.

23. The non-transitory computer readable medium of claim 17, further comprising the step of selecting another network element as the test network element and repeating the steps of instructing the test network element to transmit the test signal on a second frequency as the test frequency; and measuring micro-reflections until a plurality of network elements on a network port of a cable modem termination system and a plurality of usable upstream frequency channels have been tested.

24. The non-transitory computer readable medium of claim 17, wherein the instructions further comprise performing the step of estimating a location of a source of micro-reflections in a network based on delay times between a signal and a corresponding micro-reflections and a propagation velocity factor of cables in the network.

\* \* \* \* \*